(12) United States Patent
de Almeida

(10) Patent No.: US 10,978,862 B2
(45) Date of Patent: Apr. 13, 2021

(54) CABLE BRACKET

(71) Applicant: Thomas Carl de Almeida, Ashland, MA (US)

(72) Inventor: Thomas Carl de Almeida, Ashland, MA (US)

(*) Notice: Subject to any disclaimer, the term of this patent is extended or adjusted under 35 U.S.C. 154(b) by 135 days.

(21) Appl. No.: 16/374,077

(22) Filed: Apr. 3, 2019

(65) Prior Publication Data

US 2020/0321762 A1 Oct. 8, 2020

(51) Int. Cl.
*H02G 3/00* (2006.01)
*H02G 3/32* (2006.01)

(52) U.S. Cl.
CPC ..................... *H02G 3/32* (2013.01)

(58) Field of Classification Search
CPC ....................................................... H02G 3/32
See application file for complete search history.

(56) References Cited

U.S. PATENT DOCUMENTS

| | | | | |
|---|---|---|---|---|
| 6,992,247 B2* | 1/2006 | Rasmussen | ............. | G06F 1/189 174/494 |
| 7,622,673 B2* | 11/2009 | Quijano | .................. | G06F 1/181 174/101 |
| D612,225 S * | 3/2010 | Forte | ............................. | D8/356 |
| 2007/0235597 A1* | 10/2007 | Winchester | ............. | F16L 3/223 248/68.1 |
| 2009/0014210 A1* | 1/2009 | Forbis | ...................... | H02G 3/32 174/480 |
| 2012/0049011 A1* | 3/2012 | Liu | .......................... | H02G 3/32 248/68.1 |
| 2014/0153187 A1* | 6/2014 | Liu | ...................... | H05K 7/1491 361/679.58 |

* cited by examiner

*Primary Examiner* — Pete T Lee

(57) ABSTRACT

A cable bracket that can be used to hold and route electrical cables and other wires. The cable bracket has a base member and a plurality of thin flexible fingers projecting from the base member. The fingers define slots that are each adapted to releasably hold a cable or wire.

17 Claims, 4 Drawing Sheets

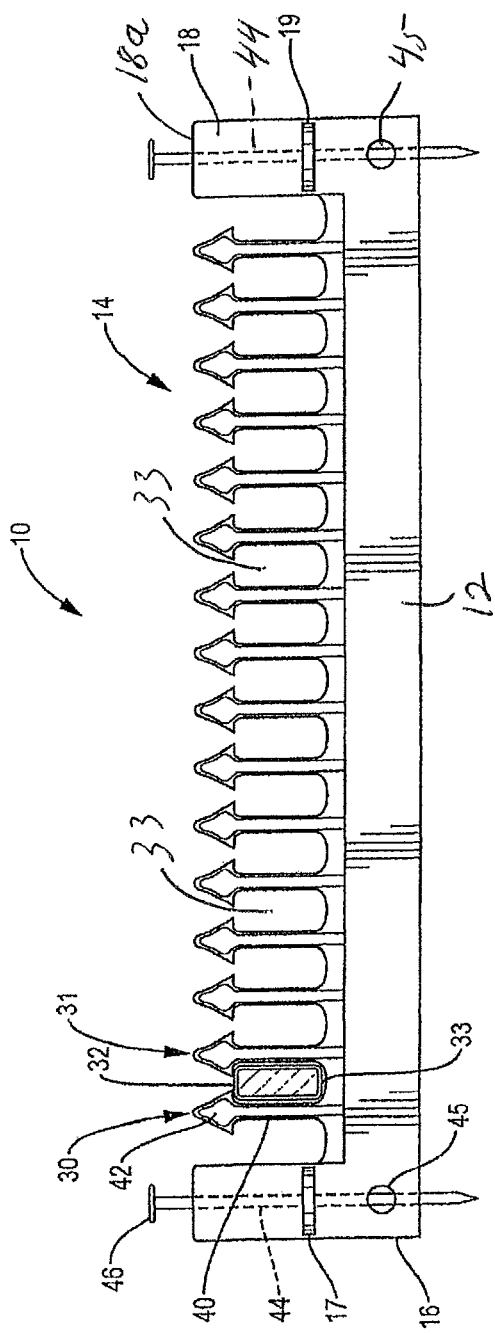
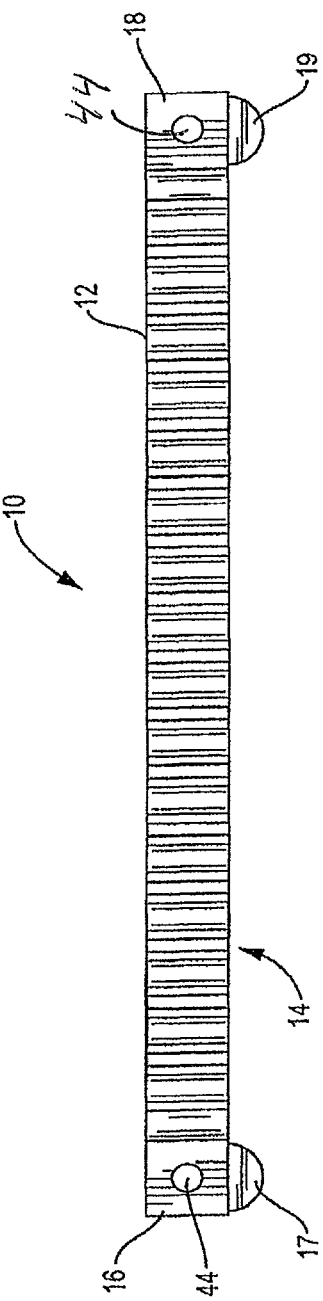

CABLE BRACKET

FIELD

This disclosure relates to a bracket that holds electrical cables and other wires.

BACKGROUND

Electrical cables and other wires need to be routed throughout buildings. They are often times stapled to building structural members. Stapling is a labor-intensive operation.

SUMMARY

Featured in this disclosure is a cable bracket that can be used to hold and route a number of electrical cables and other wires. The bracket is constructed and arranged to be fixed to a building structural member such as a joist or a stud. The bracket includes a number of slots that are each adapted to releasably hold a cable or wire. The slots are preferably arranged side-by-side. The number of slots and their sizes (height and width) can be designed to achieve a desired result. For example, in one non-limiting embodiment the bracket has 10-15 slots that are sized and shaped to hold typical Romex cable, such slots having dimensions of about ¼"×¾". Slots can also be sized to hold typical 120V and/or 240V cables, or lower or higher voltage wiring, or any other type of electrical cables and wiring (e.g., network cabling). The slots are designed such that a cable can be pushed into a slot and then held therein such that the cable will not fall out due to gravity, but can be pulled out as necessary. This can be accomplished by including in the bracket a number of parallel flexible fingers that project from a common base member, where the slots are defined between adjacent fingers. The slots can have desired widths, to accommodate different types of wires and cables and the like. The distal ends of the fingers are enlarged, such that the distance between adjacent fingers proximate their distal ends (which defines the entrance to the slot) is less than the slot width (and less than the thickness of the wire/cable to be held in the slot). To insert a wire or cable in a slot it is pushed into the slot through the slot entrance. The fingers bend enough to allow the wire/cable to enter the slot and seat in the slot. The flexible fingers then naturally bend back to their original states, thereby re-creating the narrowed slot entrance and so preventing the wire or cable from falling out of the slot.

All examples and features mentioned below can be combined in any technically possible way.

In one aspect, a cable bracket includes a base member and a plurality of thin flexible spaced fingers projecting from the base member. The fingers define a plurality of slots, each slot adapted to releasably hold a cable.

Examples may include one of the above or following features, or any combination thereof. The number of slots and their height and width may be configured to achieve a desired result. At least some of the slots may be sized to hold 120V and/or 240V cables. The cable bracket may further comprise first and second end members, one at one of two spaced ends of the cable bracket, wherein the fingers are located between the first and second end members. The end members may each define two orthogonal through holes configured to allow a fastener to pass therethrough.

The slots may be configured such that a cable can be pushed into a slot and then held therein such that the cable is inhibited from falling out of a slot due to gravity. The slots may be further configured such that a cable can be pulled out of a slot. The fingers may have distal ends that are enlarged, such that the distance between adjacent fingers proximate their distal ends which defines the entrance to the slot is less than the slot width. The distance between adjacent fingers proximate their distal ends which defines the entrance to the slot may be less than the thickness of the wire that is held in the slot. The distal ends of the fingers may each define a full or partial arrowhead. The cable bracket may further comprise at least one stop that projects from a side of the bracket. The stop may set a distance that the bracket will project below a joist. The distance that the bracket will project below a joist may be less than the thickness of ceiling strapping.

BRIEF DESCRIPTION OF THE DRAWINGS

FIG. 2 is a side view of a cable bracket.

FIG. 3 is a bottom view of the cable bracket of FIG. 2.

DETAILED DESCRIPTION

Figure 1:
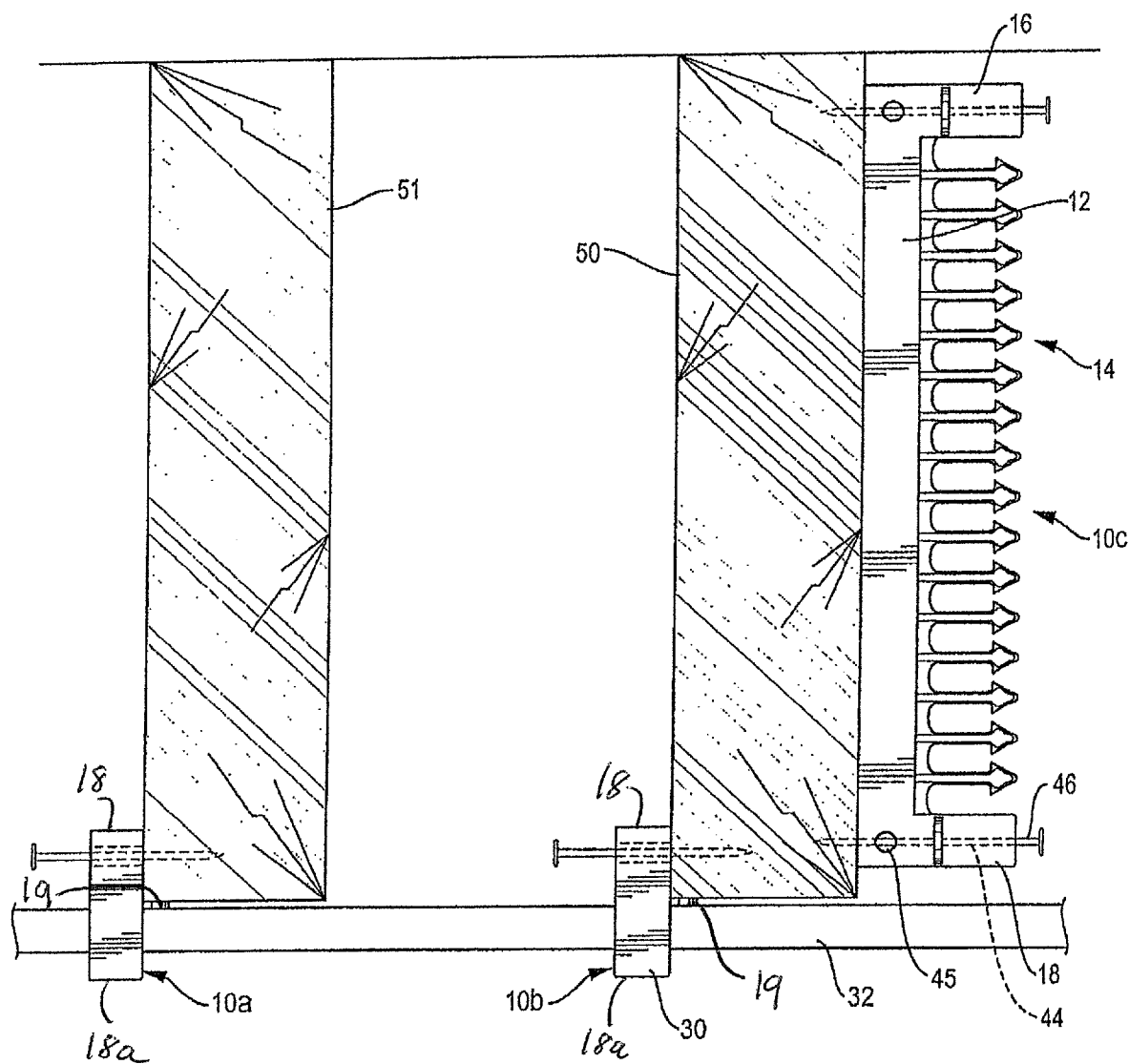
FIG. 1 is a side view of three separate cable brackets attached to two wooden ceiling joists.
Figure 4:
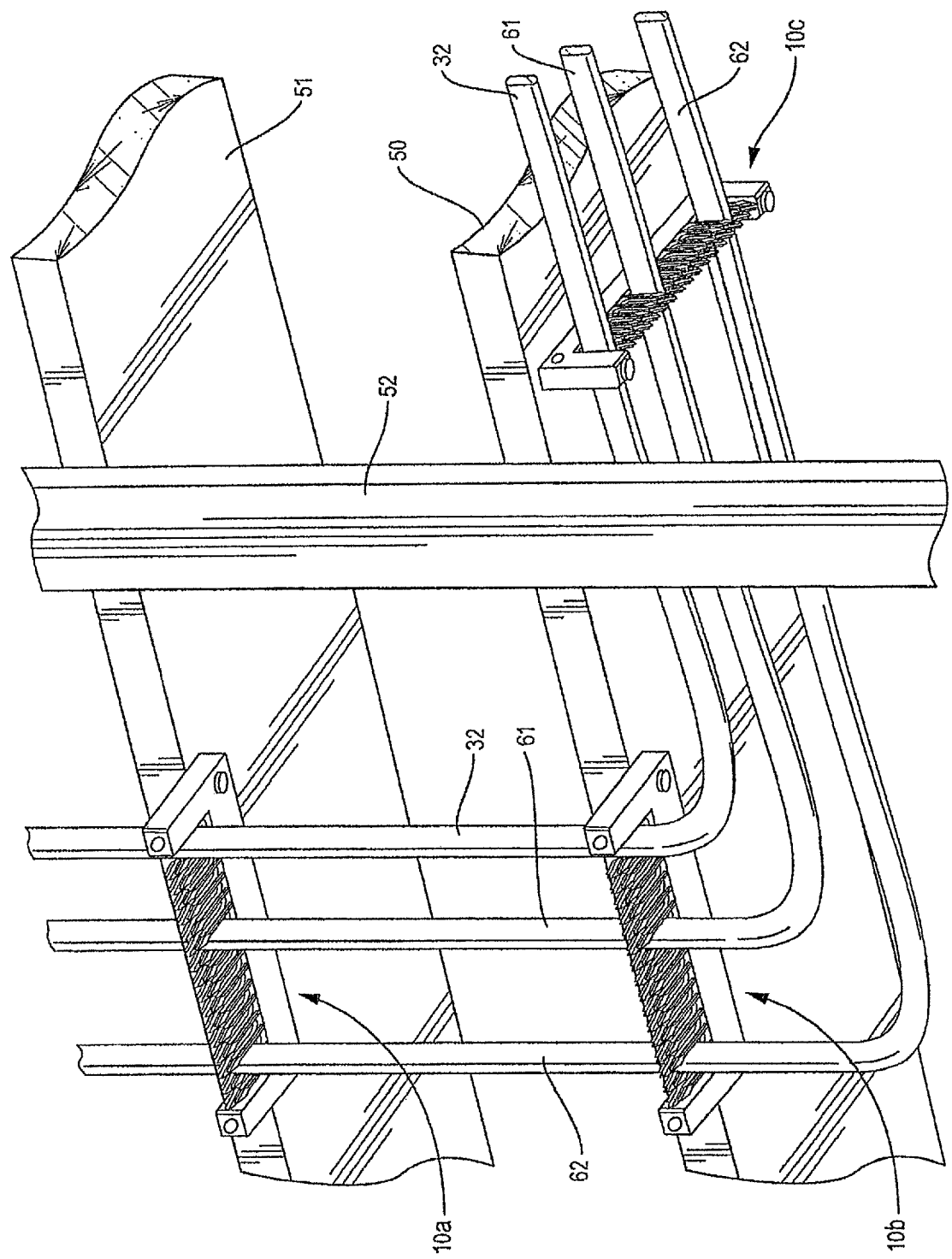
FIG. 4 illustrates three cable brackets attached to two ceiling joist.

One non-limiting example of the cable bracket 10 is shown in FIGS. 1-4 of the drawings. Cable bracket 10 comprises base member 12 and a set 14 of flexible parallel fingers projecting from base 12. As an example, adjacent fingers 30 and 31 (FIG. 2) define space or slot 33 into which a wire or cable 32 can be placed. Wires 61 and 62 are also depicted in FIG. 1. Slots 33 can have a desired width, and the slots need not all have the same width. For example there could be slots to hold common electrical cable sizes, such as slots for 120V cables and/or slots for 240V cables. There could be a slot for a larger wire such as a 50 amp 220 v wire that is typically used for an electric range, and a slot for a 30 amp 220 v wire for an electric clothes drier, with the rest of the slots smaller and used for 20 amp 120 v and 220 v cables for the rest of the home. Finger head 42 is wider than body 40 so that the entrance to the slot is narrower than the wire or cable, so the cable can't fall out of the slot due to gravity. Head 42 can take any enlarged shape; the shape shown in the drawings is illustrative and not limiting. For example half of each "arrowhead" (i.e., one of the sides of the head) could be eliminated, leaving half an arrowhead. Or the ends/heads could be rounder than shown; see, e.g., FIG. 5. Other head designs are possible.

Cable bracket 10 has thicker end members 16 and 18 that define openings 44 and 45 that can accept a fastener (typically but not necessarily a nail 46) so that the brackets can be fastened to a surface. In stick framed structures, the surfaces are typically of structural members such as joists 50 and 51, but can be other structural members such as 2×4s, 2×6s and 2×8s, for example. Since openings 44 and 45 are in orthogonal directions (along the length and width of an end member), bracket 10 can be nailed to a joist such that it runs parallel to the joist (as with brackets 10a and 10b, FIG. 4), or such that it runs across the joist (as with bracket 10c).

Stops 17 and 19 can be included. These stops can project from one or both sides of the bracket. Stops 17 and 19 set a distance that the bracket will project below a joist, as illustrated by brackets 10a and 10b, FIG. 1. This distance will typically be less than the thickness of ceiling strapping 52, so that the cable brackets do not interfere with hanging sheetrock or other finishing surfaces from the joists. For example, as shown in FIG. 1, bottom ends 18a of end members 18 are a distance below the lower ends of joists 50 and 51 that is less than the thickness of strapping 52. The distance is set by placing the side of base member 12 from which the stop projects against the side of the joist and pushing the cable bracket up until the stop contacts the bottom of the joist, and then nailing the bracket to the joist at a location between the strapping.

Figure 5:
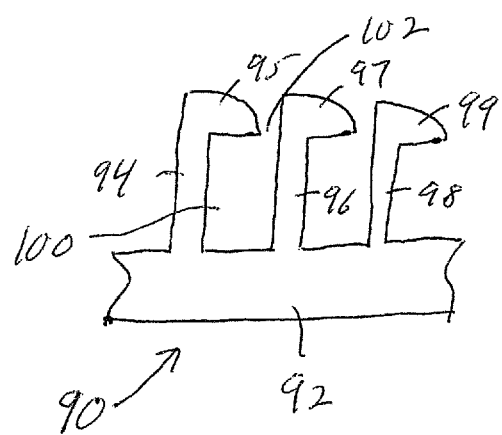
FIG. 5 is a partial side view of a cable bracket, illustrating alternative shapes for the distal ends of the fingers.

FIG. 5 illustrates cable bracket 90 which has base member 92, and fingers 94, 96, and 98, with enlarged distal ends 95, 97, and 99. Ends 95, 97, and 99 are generally "P"-shaped. Slot 100 between fingers 94 and 96 is wider than slot entrance 102. The fingers can bend left and right to allow a wire or cable that is wider than slot entrance 102 to be pushed through the slot entrance and into the slot. The fingers are made from a plastic material that returns to its original position once the cable has been pushed through the slot entrance. The flat undersides of the enlarged ends presents a surface at right angles to the cable. If the cable is held such that gravity tends to pull it down toward the slot entrance, the cable will contact the flat underside of the enlarged distal end and so is retained in the slot.

A number of implementations have been described. Nevertheless, it will be understood that additional modifications may be made without departing from the scope of the inventive concepts described herein, and, accordingly, other examples are within the scope of the following claims.

What is claimed is:

1. A cable bracket that can be used to hold and route electrical cables and other wires, comprising:
    a base member;
    a plurality of thin flexible spaced fingers projecting from the base member;
    wherein the fingers define a plurality of slots, one slot between each pair of adjacent fingers, wherein each slot is adapted to releasably hold a cable; and
    at least one stop that projects from a side of the bracket, wherein the stop sets a distance that the bracket will project below a joist.

2. The cable bracket of claim 1, wherein the number of slots and their height and width are configured to achieve a desired cable retention result.

3. The cable bracket of claim 1, wherein at least some of the slots are sized to hold 120V and/or 240V cables.

4. The cable bracket of claim 1, wherein the slots are configured such that a cable can be pushed into a slot and then held therein such that the cable is inhibited from falling out of a slot due to gravity.

5. The cable bracket of claim 4, wherein the slots are further configured such that a cable can be pulled out of a slot.

6. The cable bracket of claim 4, wherein the fingers have distal ends that are enlarged, such that the distance between adjacent fingers proximate their distal ends which defines the entrance to the slot is less than the slot width.

7. The cable bracket of claim 6, wherein the distance between adjacent fingers proximate their distal ends which defines the entrance to the slot is less than the thickness of the wire that is held in the slot.

8. The cable bracket of claim 7, wherein the distal ends of the fingers define a full or partial arrowhead.

9. The cable bracket of claim 1, wherein the distance that the bracket will project below a joist is less than the thickness of ceiling strapping.

10. The cable bracket of claim 1, further comprising first and second end members, one at each of two spaced ends of the cable bracket, wherein the fingers are located between the first and second end members.

11. The cable bracket of claim 10, wherein the end members each define two orthogonal through holes configured to allow a fastener to pass therethrough.

12. A cable bracket that can be used to hold and route electrical cables and other wires, comprising:
    a base member; and
    a plurality of thin flexible spaced fingers projecting from the base member, wherein the fingers define a plurality of slots between adjacent fingers, each slot adapted to releasably hold a cable, wherein some of the slots are sized to hold 120V and/or 240V cables;
    wherein the fingers have distal ends that are enlarged, such that the distance between adjacent fingers proximate their distal ends which defines an entrance to a slot is less than a slot width, and wherein the width of the entrance to the slot is less than the thickness of the cable that is held in the slot;
    wherein the slots are configured such that a cable can be pushed into a slot and then held therein such that the cable is inhibited from falling out of a slot due to gravity, but can be pulled out of a slot; and
    at least one stop that projects from a side of the bracket, wherein the stop sets a distance that bracket will project below a joist.

13. The cable bracket of claim 1, wherein the distance that the bracket will project below a joist is less than the thickness of ceiling strapping.

14. The cable bracket of claim 12, further comprising first and second end members, one at each of two spaced ends of the cable bracket, wherein the fingers are located between the first and second end members.

15. The cable bracket of claim 14, wherein the end members each define two orthogonal through holes configured to allow a fastener to pass therethrough.

16. The cable bracket of claim 1 comprising two stops, wherein one stop projects from the first end member and the other stop projects from the second end member.

17. The cable bracket of claim 14 comprising two stops, wherein one stop projects from the first end member and the other stop projects from the second end member.

* * * * *